Dec. 16, 1958    W. P. OEHLER ET AL    2,864,222
FOLD OVER DISK HARROW

Filed July 17, 1956    2 Sheets-Sheet 1

INVENTORS.
WILLIAM P. OEHLER
CHARLES H. YOUNGBERG
BY
ATTORNEYS

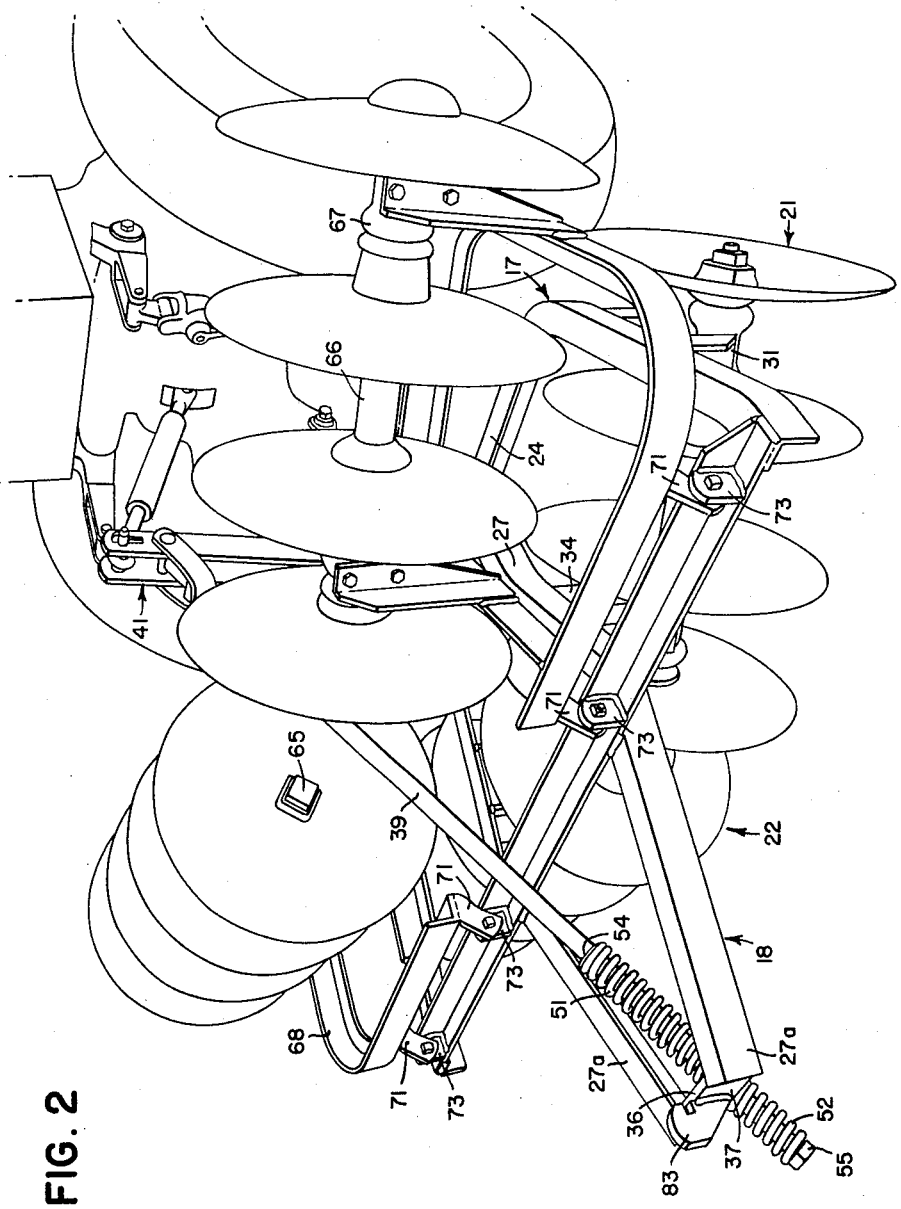

United States Patent Office 2,864,222
Patented Dec. 16, 1958

2,864,222

FOLD-OVER DISK HARROW

William P. Oehler and Charles H. Youngberg, Moline, Ill., assignors, by mesne assignments, to Deere & Company, a corporation of Delaware Application July 17, 1956, Serial No. 598,332

8 Claims. (Cl. 172—441)

The present invention relates generally to agricultural implements and more particularly to a pick-up or lift type disk harrow.

The object and general nature of the present invention is a provision of a pick-up or lift type disk harrow having new and improved means whereby the rear gangs of the harrow may, when desired, be swung from an operating position over onto the front gangs when it is not desired to have any tandem disk harrow action.

An important feature of this invention is the provision of a lift type disk harrow in which the rear gangs are individually swingable between a position coplanar with the front gangs and a position overlying the front gangs, thereby adding weight to the latter, with means rigidly holding the rear gangs in coplanar relationship, and more specifically, it is a feature of this invention to provide rear gang holding means in the form of a rear frame extension that is rigid with the front gang frame, extending rearwardly therefrom and adapted to be rigidly connected to the rearmost portions of the rear gangs when in tandem operating position.

These and other objects and advantages of the present invention will be apparent to those skilled in the art after a consideration of the following detailed description, taken in conjunction with the accompanying drawings, in which:

Fig. 2 is a view similar to Fig. 1, showing the rear gangs swung out of their coplanar relationship with the front gang means and into a position substantially directly over the latter so as to add their weight to the latter and thus increase the penetration of the front disks.

Figure 1:
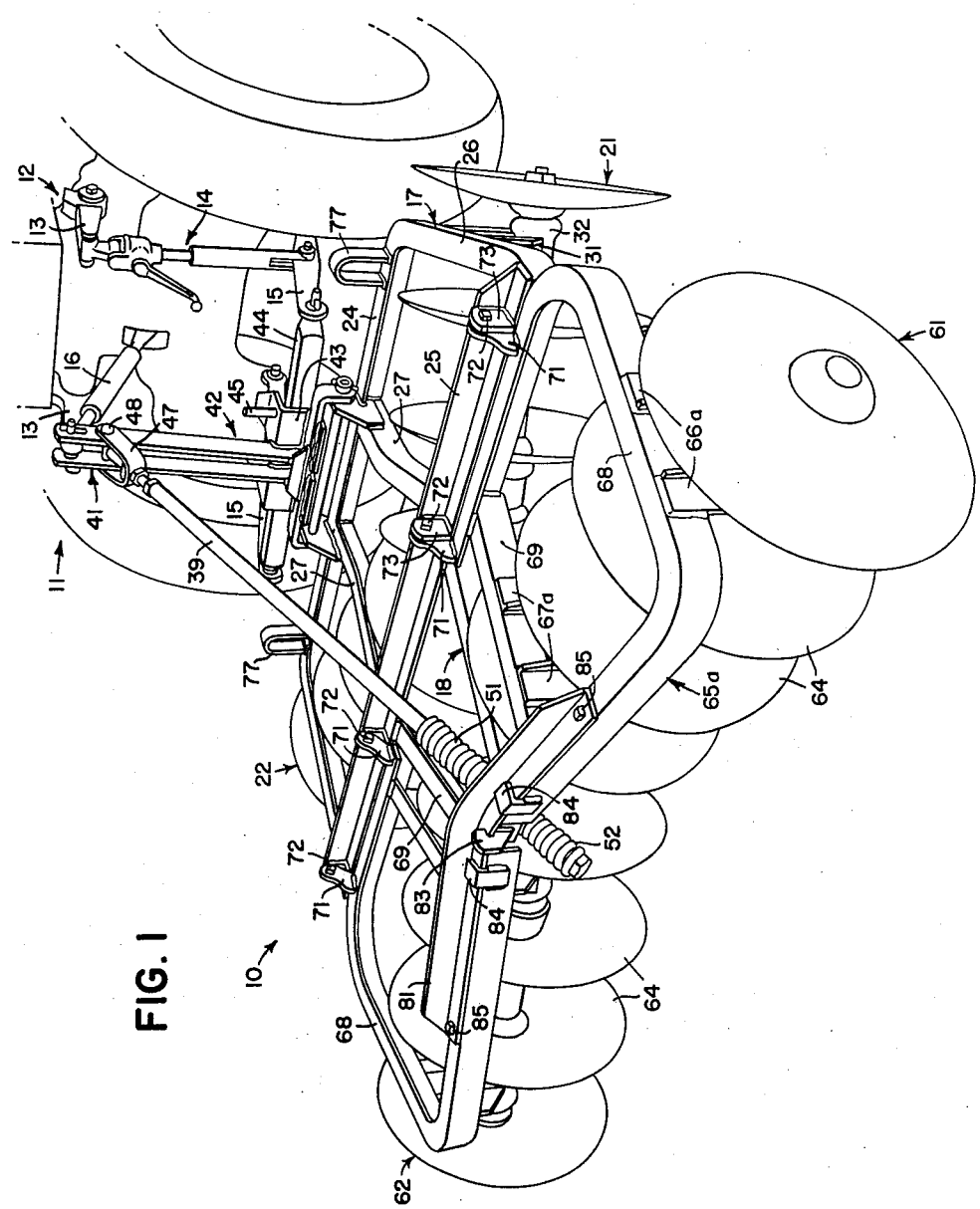
Fig. 1 is a perspective view of a tandem lift type disk harrow in which the principles of the present invention have been incorporated, the harrow being illustrated as connected to a tractor having what is commonly referred to as a three point hitch, which hitch includes an upper thrust or compression link and a pair of lower draft or tension links.

Referring first to Fig. 1, the disk hrarow is indicated in its entirety by the reference numeral 10 and is shown as connected to the tractor 11 of the type that includes a power lift unit 12 which is connected to operate a pair of lift arms 13 that are connected through adjustable lift links 14 with a pair of lower draft links 15. The lower links 15, together with an upper link 16, which may be adjustable, constitutes a three point hitch that normally is carried by the tractor and is adapted to receive various agricultural implements, among which is the disk harrow 10.

The disk harrow 10 includes a front disk gang means that is made up of a front transverse frame 17 having a rear frame extension 18 and carrying right and left hand front gangs 21 and 22. The frame means 17 includes a front transverse bar 24, a rear transverse bar 25, end bars 26 and center bars 27, the latter being extended rearwardly, forming the above mentioned rear frame extension 18. Bearing standards 31 extend downwardly from the end frame members 26 to receive bearing means 32 by which the outer ends of the disk gangs 21 and 22 are connected with the outer portions of the transverse frame structure 17. The inner ends of the front gangs 21 and 22 carry similar bearing means (not shown) that are connected to the lower ends of bearing standards 34, one of which is shown in Fig. 2, which standards are connected at the upper end to the forward portions of the center frame bars 27. These portions of the center bars 27 extend rearwardly in divergent relation, being disposed generally parallel to the rearwardly divergent end bars 26. The bar sections making up the rear frame extension 18 are bent so as to extend rearwardly in converging relation, and the rear ends of these bar portions, indicated at 27a in Fig. 2, are interconnected by a crossbar 36 that includes an apertured portion 37 through which the rear portion of an upwardly and forwardly extending brace member 39 is disposed. The forward end of the brace member 39 is suitably connected to the upper portion or mast section 41 of a generally vertical hitch frame indicated in its entirety by the reference numeral 42. The lower portion of the hitch frame 42 includes a socket section 43 that is adapted to detachably receive a crossbar 44, the ends of which are formed as studs and/or detachably connected with the rear ends of the tractor draft links 15. Suitable latch means 45 (which does not form any significant portion of the present invention) optionally locks the crossbar 44 in the socket section 43. Preferably, the upper end of the brace rod 39 is connected by means of a yoke 47 and a pivot 48 with the upper portion of the mast section 41. A pair of cushioning springs 51 and 52 are disposed on the rear end of the brace rod 39, on opposite sides of the crossbar 36, the inner ends of the springs 51 and 52 bearing against the crossbar 36 while the outer ends bear against suitable abutments 54 and 55 on the brace rod 39.

The disk harrow 10 also includes a pair of rear gangs, indicated generally at 61 and 62. Each of these rear gangs includes a disk gang section that is made up of disks 64 and an interconnecting gang bolt 65, together with associated spacing spools 66 and bearing means 67, there being one of such bearing means at each end of the rear gang. Each gang of disks 64 is connected to a rear gang frame 65a by means of pairs of bearing standards 66a and 67a suitably secured, as by welding or the like, at their upper ends to a curved angle bar 68 that forms the principal portion of the rear gang frame 65. The latter also includes a crossbar, preferably also an angle, as indicated at 69, to which the bearing standard 67a at the inner end of the associated gang of disks are connected. A pair of lugs 71 are fixed to the transverse rear portion of the rear gang frame and are apertured to receive pivot bolts 72 by which the lugs 71 are swingably connected with similar lugs 73 carried by the associated portion of the transverse frame member 25 of the front gang means.

The left hand rear gang is of substantially identical construction, except that certain parts may be left hand instead of right hand, as that just described, and hence the same reference numerals have been employed. It is to be noted that the pivotally interconnected lugs 71 and 73 at both sides of the rear extension 18 of the front frame end provides means making it possible to separately and individually shift the position of either or both of the rear gangs, as desired. The front bar 24 of the rear gang means carries a pair of U-shaped lugs 77, one at each side of the front frame, to serve as abutments or rests positioned to receive the rear bar sections of the rear gangs, when the latter are in their folded or forwardly disposed positions, as shown in Fig. 2.

When the rear gangs are in operating position, in which they occupy positions in the same plane as the front gang means, the rear gangs are swung downwardly from the positions shown in Fig. 2 into positions at opposite sides of the rear frame extension 18, as shown in Fig. 1. The laterally inner portions of the rear gang frames are rigidly connected to the rear frame extension 18 by means of a transverse bar 81 that is bent to correspond to the angularity of the rear frame sections of the rear gang frames. The central portion of the rear extension crossbar 36 carries a forwardly extending hook section 83, and the rearwardly laterally inner end of each rear frame carries a forwardly extending hook section 84, the hook sections 84 being spaced relatively closely to the hook section 83. As best shown in Fig. 1, one flange of the transverse bar 84 is adapted to be passed rearwardly into interengagement with the hook sections 83 and 84, and then bolts 85 are inserted in associated openings for locking the transverse bar 84 to the rear frames, whereby the rear gangs will be rigidly and securely held in proper coplanar relationship with the front gang means.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A lift type disk harrow adapted to be connected to a propelling tractor, comprising a transverse frame adapted to be connected with the tractor and including a rear part extending rearwardly from the generally central portion of said frame, front gang means carried by said transverse frame, a pair of rear gang units pivotally connected with said main frame and disposed above said rearwardly extending part, each of said rear gang units being independently movable from a position in rear of the front gang means to a position substantially over the latter, and means connected with the rear portions of said rear gangs and said rear part for holding said rear gangs in rigid relationship with said transverse frame.

2. The invention set forth in claim 1, further characterized by an upwardly extending frame part connected with the forward central portion of said transverse frame, and brace means extending from the upper portion of said upwardly extending part rearwardly in a vertical plane lying between said rear gang units to the rear end of said frame extension.

3. A lift type disk harrow adapted to be mounted on a tractor having hitch means serving as a three point hitch, said disk harrow comprising a generally vertical hitch frame having upper and lower connection points to receive said hitch means, a front disk harrow gang including a transversely disposed frame including a rearwardly directed generally centrally disposed frame extension, means rigidly connecting the transverse gang frame with said hitch frame, a pair of rear gangs disposed at opposite sides of said rear frame extension and hingedly connected at their forward portions with the adjacent rear portions of said front gang frame, and means connecting the rear laterally inner portions of said rear gangs to the rear portion of the rear frame extension to hold said rear gangs in rigid relation to said front gang.

4. A lift type disk harrow adapted to be mounted on a tractor having hitch means serving as a three point hitch, said disk harrow comprising a generally vertical hitch frame having upper and lower connection points to receive said hitch means, a front disk harrow gang including a transversely disposed frame hingedly connected along its front portion with the lower portion of said hitch frame and including a rearwardly directed generally centrally disposed frame extension, a pair of rear gangs disposed at opposite sides of said rear frame extension and hingedly connected at their forward portions with the adjacent rear portions of said front gang frame, the rear end of said frame extension being disposed adjacent and between the rear portions of said rear gangs, brace means connected between the rear end portion of said rear extension and the upper portion of said hitch frame, and means connecting the rear laterally inner portions of said rear gangs to the rear frame extension to hold said rear gangs in rigid relation to said front gang.

5. The invention set forth in claim 4, further characterized by said last mentioned means comprising a part extending over the rear end of said frame extension and the adjacent portions of said rear gangs and secured to the latter to hold them in coplanar relationship.

6. The invention set forth in claim 4, further characterized by said last mentioned means comprising a transverse bar extending over the rear end of said frame extension, means connecting the end portions of said bar with the adjacent rear portions of said rear gangs, and means connecting the central portion of said bar to the rear part of said frame extension.

7. A lift type disk harrow comprising a front transverse frame including front and rear transverse bars and central and end bars rigidly connected with said transverse bars, said central bars extending generally rearwardly of the rear transverse bar, front disk gang means carried by the central and end bars of said front frame, a pair of rear gangs, each including a gang frame, means connecting said rear gang frames for hinging movement to the generally outer portions of the rear bar of said front frame at opposite sides of said central bars, the inner ends of said rear gangs being disposed adjacent the rear extended portions of said central frame bars, and means connecting the rear laterally inner portions of said rear gang frames with the rear ends of said central bars.

8. The invention set forth in claim 7, further characterized by a hitch frame disposed in generally vertical position and pivotally connected at its lower end with the front transverse bar of said first mentioned frame, a brace bar extending rearwardly and downwardly from the upper end of said hitch frame to a point adjacent the rear ends of said central bars, an apertured cross member rigidly connected to the rear ends of said central bars, said brace member extending at its rear portion through said aperture, and cushioning spring means carried by said brace bar and disposed on opposite sides of said apertured cross member.

References Cited in the file of this patent

UNITED STATES PATENTS

| | | |
|---|---|---|
| 2,640,307 | Robertson | June 2, 1953 |
| 2,704,018 | Oehler et al. | Mar. 15, 1955 |